(12) United States Patent
Tuukkanen

(10) Patent No.: US 10,102,221 B2
(45) Date of Patent: Oct. 16, 2018

(54) METHOD AND APPARATUS FOR PERFORMING AN OPTIMIZED LOCATION BASED SEARCH

(71) Applicant: HERE Global B.V., Eindhoven (NL)

(72) Inventor: Marko Tapio Tuukkanen, Schlenzer (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 15/383,088

(22) Filed: Dec. 19, 2016

(65) Prior Publication Data

US 2017/0103088 A1    Apr. 13, 2017

Related U.S. Application Data

(63) Continuation of application No. 14/289,275, filed on May 28, 2014, now Pat. No. 9,565,292.

(51) Int. Cl.
*G01C 21/00* (2006.01)
*G06F 17/30* (2006.01)
(Continued)

(52) U.S. Cl.
CPC ... *G06F 17/30241* (2013.01); *G01C 21/3667* (2013.01); *G06F 17/3087* (2013.01);
(Continued)

(58) Field of Classification Search
CPC .......... G06F 17/30241; G06F 17/3087; G01C 21/3667; H04M 1/72572
(Continued)

(56) References Cited

U.S. PATENT DOCUMENTS 6,282,489 B1 *  8/2001  Bellesfield ......... G01C 21/3676
                                                    701/426
6,947,836 B2 *  9/2005  Ono ................... G01C 21/3679
                                                    340/988
(Continued)

FOREIGN PATENT DOCUMENTS

EP           1555511 A1      7/2005

OTHER PUBLICATIONS

Notification of Transmittal of the International Search Report and the Written Opinion of the International Searching Authority or the Declaration; Written Opinion and International Search Report for corresponding International Application No. PCT/EP2015/061636, dated Aug. 10, 2015, 13 Pages.

(Continued)

*Primary Examiner* — Thomas G Black
*Assistant Examiner* — Wae L Louie
(74) *Attorney, Agent, or Firm* — Ditthavong & Steiner, P.C.

(57) ABSTRACT

An approach is provided for optimizing the generation of a location based search result. An optimization platform generates is also caused to initiate at least one second-location based search for at least one non-overlapping area of at least one first search area and at least one second search area to generate at least one set of new results. The optimization platform also designates at least one portion of the at least one first set of results as at least one set of old results. The optimization platform then returns at least one set of new results and the at least one set of old results as at least one second set of results for the at least one second location-based search.

20 Claims, 11 Drawing Sheets

(51) Int. Cl.
*G01C 21/36* (2006.01)
*H04W 4/02* (2018.01)
*H04M 1/725* (2006.01)
*H04W 4/029* (2018.01)
*H04W 88/02* (2009.01)

(52) U.S. Cl.
CPC .. *G06F 17/30905* (2013.01); *H04M 1/72572* (2013.01); *H04W 4/028* (2013.01); *H04W 4/029* (2018.02); *H04W 88/02* (2013.01)

(58) Field of Classification Search
USPC ............... 701/409, 410, 421, 426, 532, 533
See application file for complete search history.

(56) References Cited

U.S. PATENT DOCUMENTS

| | | | |
|---|---|---|---|
| 7,194,357 B2* | 3/2007 | Smith | G01C 21/30 340/990 |
| 2003/0182052 A1 | 9/2003 | Delorme et al. | |
| 2003/0229441 A1 | 12/2003 | Pechatnikov et al. | |
| 2006/0058951 A1* | 3/2006 | Cooper | G01C 21/26 701/532 |
| 2008/0109159 A1* | 5/2008 | Shi | G01C 21/32 701/421 |
| 2013/0218463 A1* | 8/2013 | Howard | G06F 17/30657 701/533 |
| 2013/0304372 A1* | 11/2013 | Mellert | G01C 21/3679 701/410 |
| 2015/0142244 A1* | 5/2015 | You | G01C 21/00 701/23 |

OTHER PUBLICATIONS

Resch et al., "User Experience Design in Professional Map-Based Geo-Portals", ISPRS International Journal of Geo-Information, 2013, vol. 2, No. 4, retrieved on Dec. 2, 2016 from http://www.mdpi.com/2220-9964/2/4/1015/htm, pp. 1015-1037.

Office Action for corresponding European Patent Application No. 15 726 091.0-1222, dated Feb. 19, 2018, 10 pages.

* cited by examiner

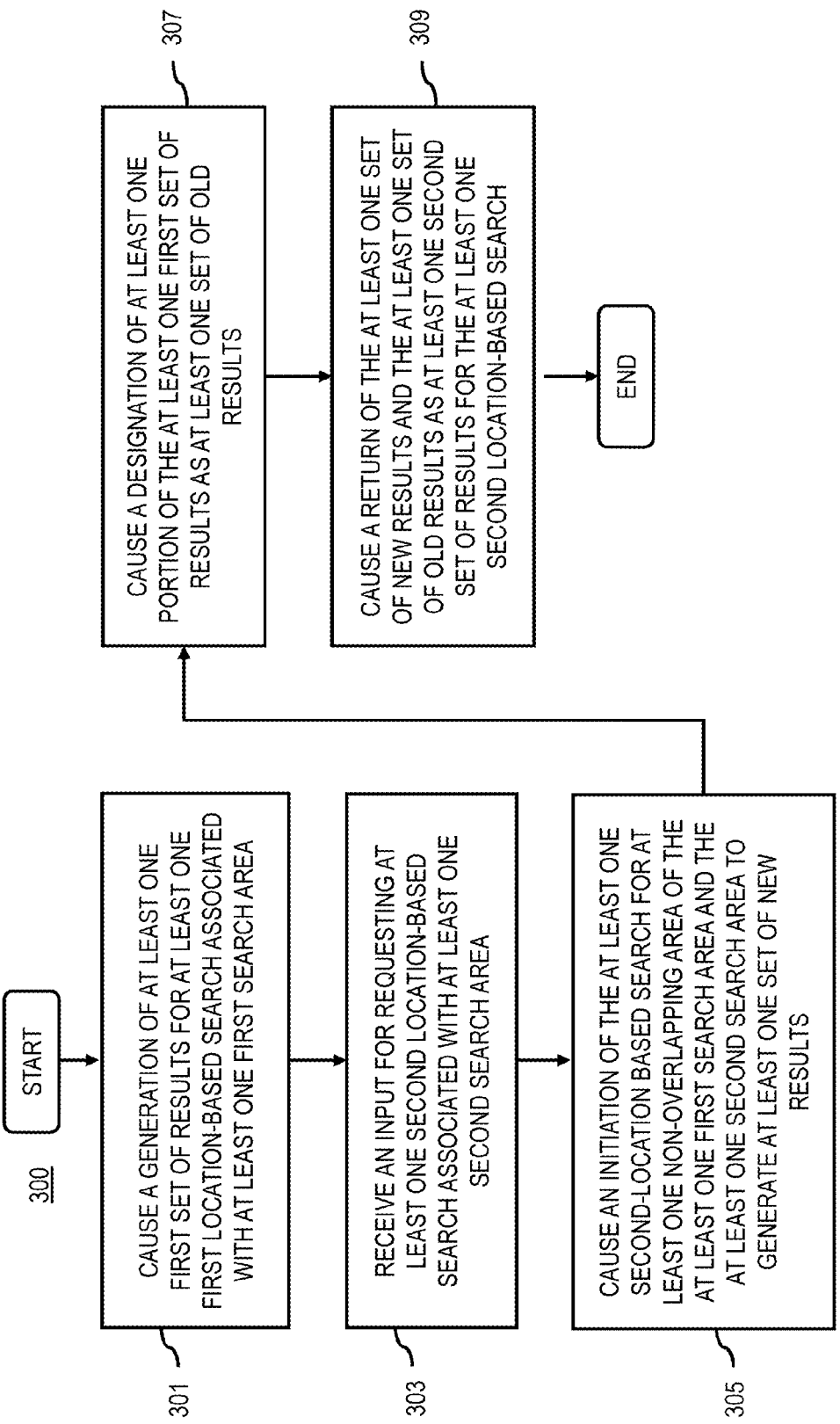

METHOD AND APPARATUS FOR PERFORMING AN OPTIMIZED LOCATION BASED SEARCH

CROSS REFERENCE TO RELATED APPLICATIONS

This application is a continuation of U.S. application Ser. No. 14/289,275 filed May 28, 2014, entitled "Method and Apparatus for Performing an Optimized Location Based Search" the entirety of which is incorporated herein by reference.

BACKGROUND

Service providers, vehicle and device manufacturers (e.g., wireless, cellular, etc.) are continually challenged to deliver value and convenience to consumers by, for example, providing compelling new products and services. One area of interest has been the development of location-based services to provide users of vehicles or mobile devices (e.g., mobile phones) tools for improving their travel experience. By way of example, many vehicles and mobile devices are equipped with global positioning sensors (GPS) and navigation applications for acquiring maps and other location-based information based on user provided search criteria. Unfortunately, as the user repositions or shifts the map, another search is executed, which results in more data being acquired to update the map based on the new search results. Moreover, portions of the map presented during the initial search that overlap with the new search area are acquired again, resulting in redundancy of the data acquisition effort and more data use.

Some Example Embodiments

Therefore, there is a need for an approach for optimizing the generation of a location based search and acquiring search results.

According to one embodiment, a method for causing, at least in part, a generation of at least one first set of results for at least one first location-based search associated with at least one first search area. The method also comprises receiving an input for requesting at least one second location-based search associated with at least one second search area. The method also comprises causing, at least in part, an initiation of the at least one second-location based search for at least one non-overlapping area of the at least one first search area and the at least one second search area to generate at least one set of new results. The method also comprises causing, at least in part, a designation of at least one portion of the at least one first set of results as at least one set of old results, wherein the at least one portion of the at least one first set of results is associated with at least one overlapping area of the at least one first search area and the least one second search area. The method further comprises causing, at least in part, a return of the at least one set of new results and the at least one set of old results as at least one second set of results for the at least one second location-based search.

According to another embodiment, an apparatus comprises at least one processor, and at least one memory including computer program code for one or more computer programs, the at least one memory and the computer program code configured to, with the at least one processor, cause, at least in part, the apparatus to generate at least one first set of results for at least one first location-based search associated with at least one first search area. The apparatus is also caused to receive an input for requesting at least one second location-based search associated with at least one second search area. The apparatus is also caused to initiate the at least one second-location based search for at least one non-overlapping area of the at least one first search area and the at least one second search area to generate at least one set of new results. The apparatus is also caused to designate at least one portion of the at least one first set of results as at least one set of old results, wherein the at least one portion of the at least one first set of results is associated with at least one overlapping area of the at least one first search area and the least one second search area. The apparatus is further caused to return at least one set of new results and the at least one set of old results as at least one second set of results for the at least one second location-based search.

According to another embodiment, a computer-readable storage medium carries one or more sequences of one or more instructions which, when executed by one or more processors, cause, at least in part, an apparatus to cause, at least in part, a generation of at least one first set of results for at least one first location-based search associated with at least one first search area. The apparatus is also caused to receive an input for requesting at least one second location-based search associated with at least one second search area. The apparatus is also caused to initiate at least one second-location based search for at least one non-overlapping area of the at least one first search area and the at least one second search area to generate at least one set of new results. The apparatus is also caused to designate at least one portion of the at least one first set of results as at least one set of old results, wherein the at least one portion of the at least one first set of results is associated with at least one overlapping area of the at least one first search area and the least one second search area. The apparatus is further caused to return at least one set of new results and the at least one set of old results as at least one second set of results for the at least one second location-based search.

According to another embodiment, an apparatus comprises means for causing, at least in part, a generation of at least one first set of results for at least one first location-based search associated with at least one first search area. The apparatus also comprises means for receiving an input for requesting at least one second location-based search associated with at least one second search area. The apparatus also comprises means for causing, at least in part, an initiation of the at least one second-location based search for at least one non-overlapping area of the at least one first search area and the at least one second search area to generate at least one set of new results. The apparatus also comprises means for causing, at least in part, a designation of at least one portion of the at least one first set of results as at least one set of old results, wherein the at least one portion of the at least one first set of results is associated with at least one overlapping area of the at least one first search area and the least one second search area. The apparatus further comprises means for causing, at least in part, a return of the at least one set of new results and the at least one set of old results as at least one second set of results for the at least one second location-based search.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3, 4A and 4B are flowcharts of processes for optimizing the generation of a location based search result, according to various embodiments;

DESCRIPTION OF SOME EMBODIMENTS

Examples of a method, apparatus, and computer program for optimizing the generation of a location based search result are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
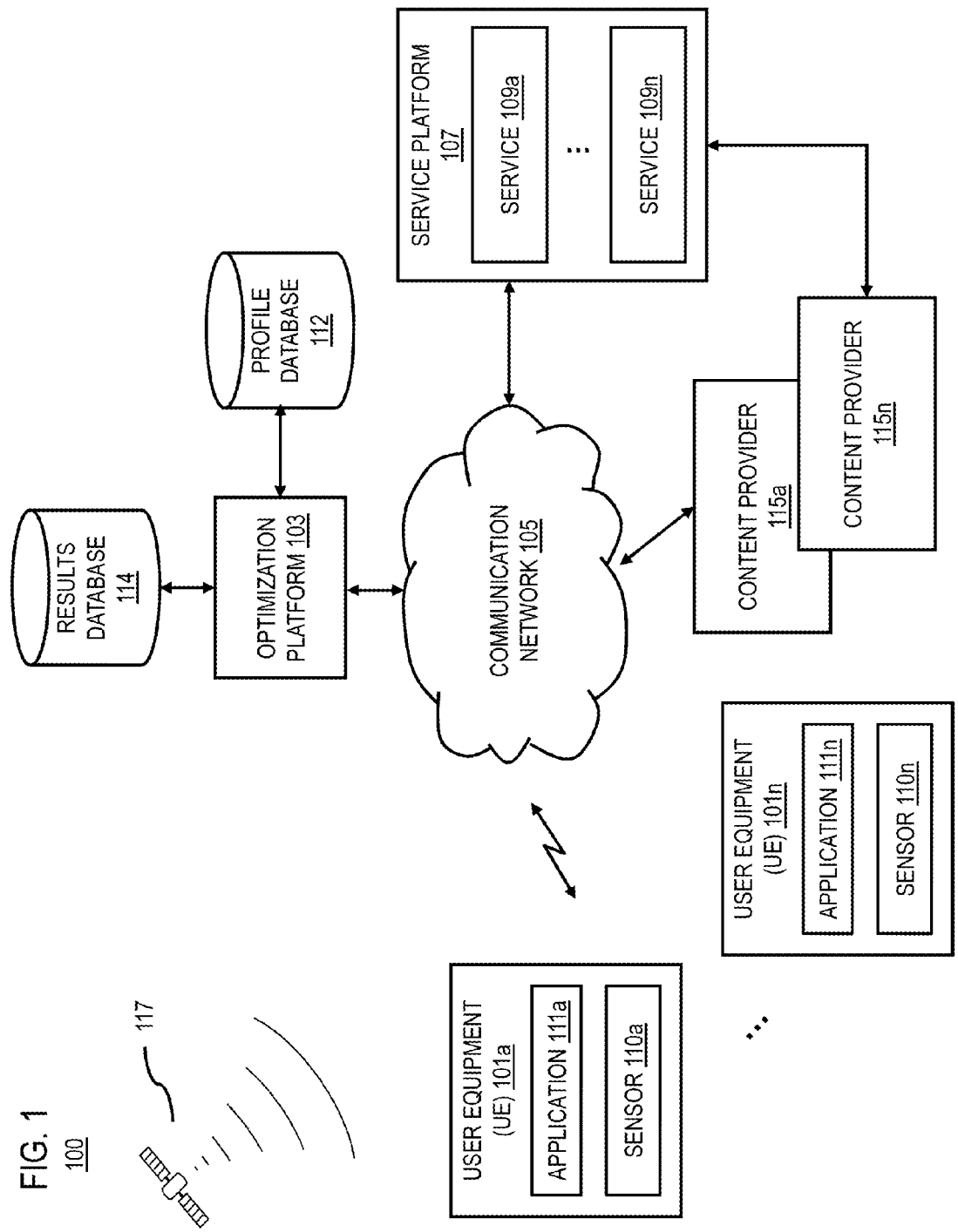
FIG. 1 is a diagram of a system for optimizing the generation of a location based search result, according to one embodiment.

FIG. 1 is a diagram of a system for optimizing the generation of a location based search result, according to one embodiment. By way of example, the location based search result may include a map representative of a given location and/or area, one or more corresponding location coordinates, one or more points-of-interest corresponding to said map and/or location coordinates, or a combination thereof.

As previously discussed, service providers, vehicle and device manufacturers are increasingly interested in developing location-based services to provide vehicle and mobile device users with useful tools for navigating to destinations or conducting area based searches. The devices may utilize location-based technologies (e.g., Global Positioning System (GPS) receivers, cellular triangulation, assisted-GPS (A-GPS), etc.) to track the relative location, heading and movement of users. In addition, the devices may be equipped with navigation and/or mapping applications for interfacing with one or more services (e.g., a navigation service) to acquire maps, point of interest data and the like that is relevant to the search request.

By way of example, the search request for "restaurants" in a given zip code may be entered to the application, resulting in the retrieval of location based information associated with this criterion. This may include, for example, retrieval of a map depicting the area (zip code) along with corresponding point of interest data representative of the restaurants in the area and their relative locations/positions on the map. Typically, the current location of the user serves as the center point for generation of the map. Hence, the search is performed using a radius from the center point of the map, using a radius from a user selected location on the map, using a boxed search to cover the visible map area, increasing the radius to cover the visible map area, etc.

In some instances, the user may not be satisfied with the initial search results as presented. Resultantly, the user may initiate a subsequent search by repositioning the map, changing the level of granularity (e.g., zoom level), filtering the results (e.g., "hot dogs" versus general "restaurants"), etc. For example, when the user moves (e.g., swipe or scroll the map) the map and a new map search is executed, the past search results are discarded and the points of interest that appeared in the previous search are presented again if they are within the search area. Unfortunately, the repeating results are not differentiated from the new search results. This redundancy of presentment of the results also corresponds to redundancy of the search effort and hence increased data transmission/acquisition on the part of the application as it interacts with the navigation service. There is currently no convenient means of optimizing a search request made by way of a navigation service in a manner that accounts for repeated search results.

To address this problem, system 100 of FIG. 1 enables users to reduce data transmission when conducting a search request, i.e., per a service. For the purpose of illustration, a service based search request may include any search performed by way of an external or remote resource or service (e.g., services 109a-109n) of a user device. The system 100 enables an overlapping area of a prior determined search result and that for generating a subsequent search result t to be readily identified. For example, the overlapping area may correspond to a common array of geo-coordinates, location points, points of interest, content, or the like for defining a common map view. By identifying the overlap, the system 100 enables the services and/or application that accesses these services to initiate a search request on the basis of the non-overlapping area, thus minimizing the redundancy of the search effort and reducing overall data transmission (data inflow and outflow).

For the purpose of illustration herein, a search request may be initiated by a user via user equipment (UE) 101a-101n (referred to collectively as UE 101) by way of applications 111a-111n (referred to collectively as applications 111). The user may specify search criteria via the application 111, such as an address or a general area (e.g., zip code, state, geographic zone/area/range). In addition, the user may specify a location or point of interest type (e.g., restaurant, highway, building, landmark), a contextual detail, or any other information for defining the search. This criteria is then passed on to one or more services 109a-109n (referred to collectively as services 109) as maintained by a service platform 107 for executing the search accordingly. Services 109 may include, for example, a mapping service, a navigation services, a traffic service or any other location-based service capable of being accessed by a calling application 111 upon request over a communication network 105. Of note, sensors 110a-110n (referred to collectively as sensors 110) may also collect sensory data, such as location information, speed information, tilt information and the like in connection with a search request.

In one embodiment, the applications 111, services 109, or a combination thereof may be configured to operate in connection with an optimization platform 103. The optimization platform 103 may analyze the search results associated with a first search request and a second search request to identify at least one overlapping (common) area between the search results obtained pursuant to the different search requests. The common area may correspond to a common map view, a common region or geographic range of interest, a common set of geo-coordinates or other any other location based information, content, or a combination thereof in common for fulfilling different search requests. Thus, in the case where a first search request results in a first set of search results and a second search request results in a second set of search results, the platform 103 may interact with the applications 111 and/or services 109 to determine any redundancy of data associated with respective search results.

In one embodiment, the optimization platform 103 causes generation of a first set of search results corresponding to a first search request. The search request may specify a particular search area and/or criteria for defining and directing the search. By way of example, the optimization platform 103 may intercept and/or facilitate a search request associated with a first search area as submitted via application 111. Once submitted, the optimization platform 103 may also initiate processing of the criteria to generate a first set of search results. As noted, the search results may be presented to the user via the application 111 as a map view along with corresponding point of interest data, location coordinates, etc. In addition, the search results may be stored to a results database 114 or other temporary data store.

It is noted that the results database 114 is maintained locally by the UE 101 or the platform 103 for enabling rapid access to the results at a later time. By way of this approach, the platform 103 keeps record of prior/historically performed search results for a given area. Also of note, services 109 may operate in connection with various content providers 115a-115n (referred to collectively as content providers 115) for generating and/or acquiring maps, visual data, textual data, audible data and the like that is to be presented to the user via a user interface of the application 111.

In one embodiment, the optimization platform 103 determines a second search request is initiated based on subsequently provided user input. The input may correspond to user specification of a second search area and/or other criteria to be fulfilled. Moreover, the input may be provided by way of an input field presented to the user interface, by way of a controller of the user interface such as a scroll or zoom button, by way of a touch screen interface, or the like. For example, in the case where a map representative of an area A is presented in connection with a first set of search results, the platform 103 interacts with the application 111 to detect when the user drags the map, expands it, swipes it left, right, up or down, etc.

In one embodiment, the optimization platform 103 determines if there is an overlapping area shared between the first search results as stored to database 114 and that associated with the second search request. By way of example, the platform 103 may determine the overlapping by comparing the area defined by the first search results as stored to that specified per the second search request to determine the difference. For example, the first search results as stored may correspond to an array of geo-coordinates, location points, points of interest, content, or the like for defining a first map view corresponding to a given area (e.g., per the level of granularity of the first search). Similarly, the input for initiating the second search request may correspond to an array of geo-coordinates, location points, points of interest, content, or the like for defining a second map view. Hence, the platform 103 is able to differentiate between the overlapping and non-overlapping areas accordingly. It is noted that the array may correspond to a two-dimensional or three-dimensional data set depending on the type of map view to be rendered via the data while the range of said data set is determined at least in part, on the level of granularity associated with the search.

In one embodiment, the platform 103 determines an optimal search result set based on the determined overlapping and non-overlapping search results. The optimal search result set is based on the determined overlapping area as described above. As such, the result set corresponds to an array of geo-coordinates, location points, points of interest, content, or the like for defining the common area between the prior (first search results as gathered) and the second search request. In another embodiment, the platform 103 then flags the optimal result set as a set of data that is to be restricted from being submitted to the services 109 for fulfilling the second search request. By way of example, the second search request is submitted by the platform 103 to specify a requirement for only location based information corresponding to the non-overlapping area pursuant to the second search request. By way of this approach, the platform 103 only submits the request in accordance with the array of data corresponding to the new area (non-overlapping area) as opposed to submitting the request based on both the prior determined data set (overlapping area) and non-overlapping data set. This reduces the amount of data transmitted to the service by the application 111 for initiating the request. Furthermore, as at least a portion of the search results are already locally stored, the amount of data to be acquired from the service 109 to fulfill the second search request is minimized.

In one embodiment, the search results returned pursuant to the second search request are presented to the user via the user interface of the application 111. By way of example, the user is presented with a list of search results where the prior search results (e.g., those which overlap) are differentiated from new ones. The results may be ordered for presentment based on this differentiation. For example, in the case where the second search request is for ice cream parlors within a given area, the prior determined search results may be ordered first in the list. The first new result within the list (e.g., the first non-overlapping search result) may be highlighted for distinguishing it from the prior results. Per this approach, the user may swipe down the list to see repeated search results or up to see the new results.

Alternatively, the results may be presented in a map view rather than in list form. Per this approach, the map view may be highlighted for distinguishing the prior determined map view from the newly determined map view. Under this scenario, for instance, a user of UE 101 may swipe or scroll their screen to the right to see prior determined map view corresponding to the first search results while swiping left to see the map view corresponding to the second search result.

In one embodiment, subsequent search results are also stored to the results database 114 as prior determined results data. As such, in the case of the previous example, when the user swipes beyond the map view corresponding to the second search results, the platform 103 initiates a third search request based on the above described executions. Per this approach, the optimization platform 103 keeps the search active (since acquisition of the first search result) until the user exits the application 111 or selects at least one search result. This contiguous search processing reduces the amount of user interaction required to conduct the search and in the case of a driver, lessens the number of distractions. The user need only select a new center point for the search by tapping on or panning the map, i.e., via a touchscreen display.

In one embodiment, the optimization platform 103 may also enable expansion of searches outside the determined common search area. This approach corresponds to a scenario wherein the amount of data to be transmitted by the application 111 and/or acquired is unlimited. By way of example, some vehicle based navigation systems may be limited to a certain amount of data and thus best suited for limiting the search to the area in common between the first search result and that defined for initiating the second search request. However, when no data limit applies, the search experience may be improved by extending the search area outside the current search radius based on the previous search context. This enables performance of a corridor search, wherein the search may be extended along a potential route of the user, in the direction the user is moving along or adapted to acquire a result just outside the currently visible map view. Under this scenario, the platform 103 supports the expanded search based on the previous search geocoordinates.

In addition, the corridor may be based on search patterns resulting from the previously performed (and stored) search results. As such, the user need not provide addition input for extending the search. Rather, the search may continue to be extended multiple times by the platform 103 based on the historical search pattern of user until the matching result is identified. In addition, the platform 103 may further utilize any user defined waypoints or location destinations along a defined navigation route to further expand the search.

It is noted that the search results from the expanded search area may be presented after the primary search results are acquired. Alternatively, the expanded search result may be presented as a first selection option in the case where it is a better match for fulfilling the search criteria. For example, a user of UE 101 that is currently at location coordinates [A,B] having no gas stations within range may be presented with a map view or list corresponding to a distant location [X,Y] having a gas station within range. This map view may be presented despite the lack of common area for these respective location coordinates.

In one embodiment, the optimization platform 103 also interfaces with a profile database 112, which stores data related to one or more users that access the optimization platform 103. The profile database 112 may exist in whole or part within the optimization platform 103, or independently. The profile database 112 maintains credentials associated with a specific user of the application 111, user details, user preference information and like for uniquely identifying the UE 101 and/or the user requiring access to the optimization platform 103. The profile, as created for the user and/or UE 101, may further be associated with search results maintained in the database 114. As such, a history of search results and areas may be readily retrieved in response to subsequent/future search requests placed by the user via the application 111.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, in-vehicle navigation systems, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, optimization platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
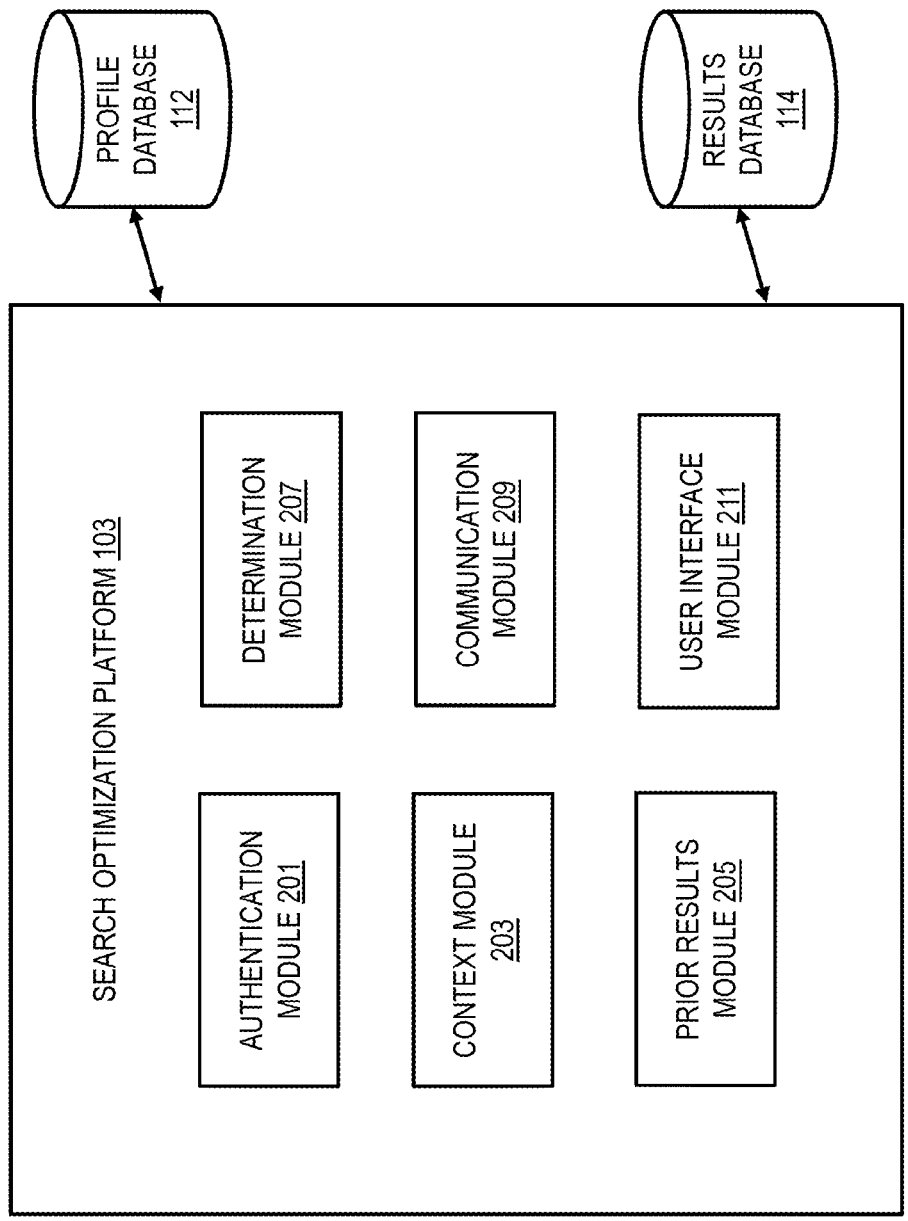
FIG. 2 is a diagram of the components of a optimization platform, according to one embodiment.

FIG. 2 is a diagram of the components of the optimization platform 103, according to one embodiment. By way of example, the optimization platform 103 includes one or more components for determining embarkation points to associate with a point of interest. It is contemplated that the functions of these components may be combined in one or more components or performed by other components of equivalent functionality. In this embodiment, the optimization platform 103 includes an authentication module 201, a context module 203, a prior results module 205, a determination module 207, a communication module 207 and a user interface module 209.

The authentication module 201 authenticates users and user devices 101a-101n for interaction with the optimization platform 103. By way of example, the authentication module 201 receives a request to subscribe to the optimization platform 103 via an application 111. The subscription process may correspond to the period of initial subscription, download or integration of the application 111 at the UE 101. Preferences and settings information, including a preferred mode of search performance or search granularity (e.g., zoom level) may be established for the user and referenced to the user as a profile maintained in database 112.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 215). Registration data 217 for respective subscribers, which contains pertinent user or device profile data, may be cross referenced as part of the login process. Alternatively, the login process may be performed through automated association of profile data for the user and/or UE with an IP address, a carrier detection signal of a user device, mobile directory number (MDN), subscriber identity module (SIM) (e.g., of a SIM card), radio frequency identifier (RFID) tag or other identifier.

Still further, the authentication module 201 may operate in connection with the communication module 209 to facilitate interact with the service platform 107 and/or the various services 109. Per this execution, the authentication procedure may extend to the services for enabling the application to interface with the services 109 to exchange data, credentials, etc. Still further, the authentication module 201 may serve as a conduit for facilitating execution of a search based on receipt of a search request transmitted per the application 111.

The context module 203 may process contextual information collected by one or more sensors 110 of the UE 101. As such, the module 203 processes relevant information for determining vehicular, user or environmental conditions that may impact a search request. In addition, the context module 203 operates in connection with the services 109 to process location-based for determining current location (e.g., geographic coordinates), temporal information and speed information regarding a UE 101.

The prior results module 205 maintains a store of a determined search result. This may include, for example, data such as geo-coordinates, location points, points of interest, content, or the like for defining a first area. This area may be further visually represented to depict a specific map view corresponding to the defined area. By storing such data locally, the prior results module 205 may be readily called upon subsequently by the determination module 207 for determining a difference between the stored/prior search area and a search area defined by a subsequent search request. As such, the determination module 207 performs the overlapping and non-overlapping area search analysis in conjunction with the prior results module 205. Based on the results, the module 207 further tags and/or associates the overlapping data for the common area, such that it is differentiated from the new area.

Still further, the determination module 207 initiates transmission of a search request based on only the determined non-overlapping area. As such, the module 207 ensure the request is submitted in accordance with the array of data corresponding to the new area (non-overlapping area) as opposed to submitting the request based on both the prior determined data set (overlapping area) and non-overlapping data set.

The communication module 209 is used for communication between the optimization platform 103, the services 109, the applications 111, and the various databases 112-114. The communication module 207 may be used to communicate commands, requests, data, etc. By way of example, the communication module 207 may be used to transit a request from a user interface (UI) of a UE 101 to obtain location-based information (e.g., turn-by-turn navigation) regarding a point of interest.

The user interface module 211 operates in connection with the communication module 209 to affect the presentment of information to a user interface of the application 111. For example, the user interface module presents a user with location-based information obtained as a result of a submitted search request. The search results may be presented in map form, list form or a combination thereof. Of note, the user interface module 211 may execute various application programming interfaces (API) for facilitating the display of graphic elements via the application 111 based on execution of the other modules 201-209.

The above presented modules and components of the optimization platform 103 can be implemented in hardware, firmware, software, or a combination thereof. Though depicted as a separate entity in FIG. 1, it is contemplated that the platform 103 may be implemented for direct operation by respective UEs 101. As such, the optimization platform 103 may generate direct signal inputs by way of the operating system of the UE 101 for interacting with the application 111. In another embodiment, one or more of the modules 201-211 may be implemented for operation by respective UE as a platform 103, or combination thereof.

Figure 4B:
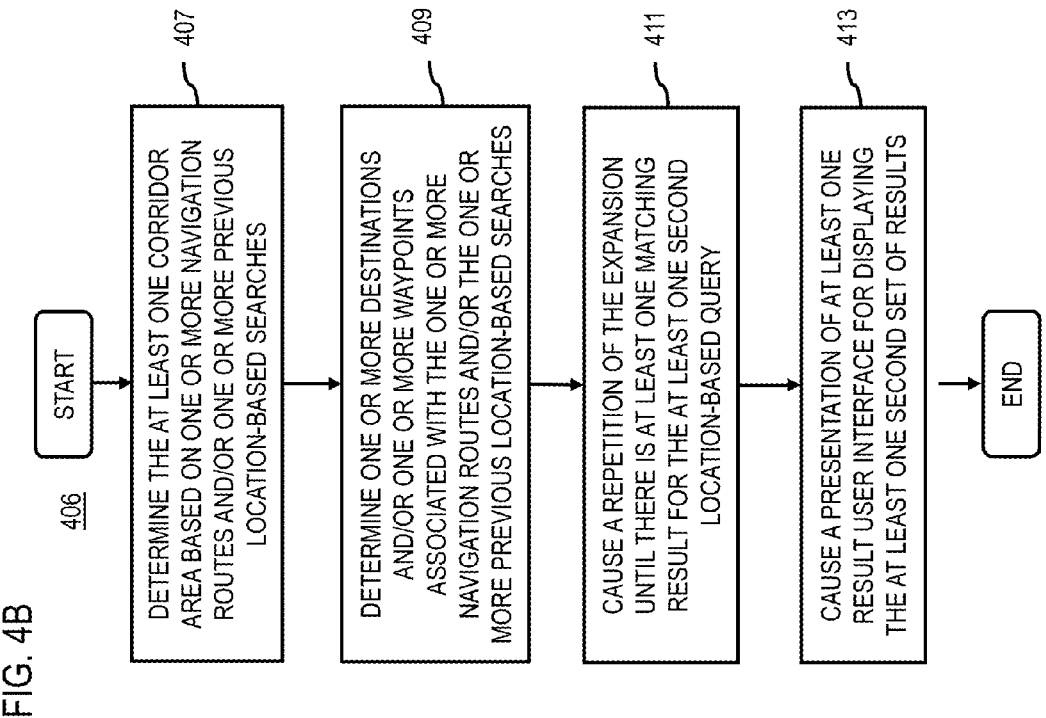
Figure 4A:
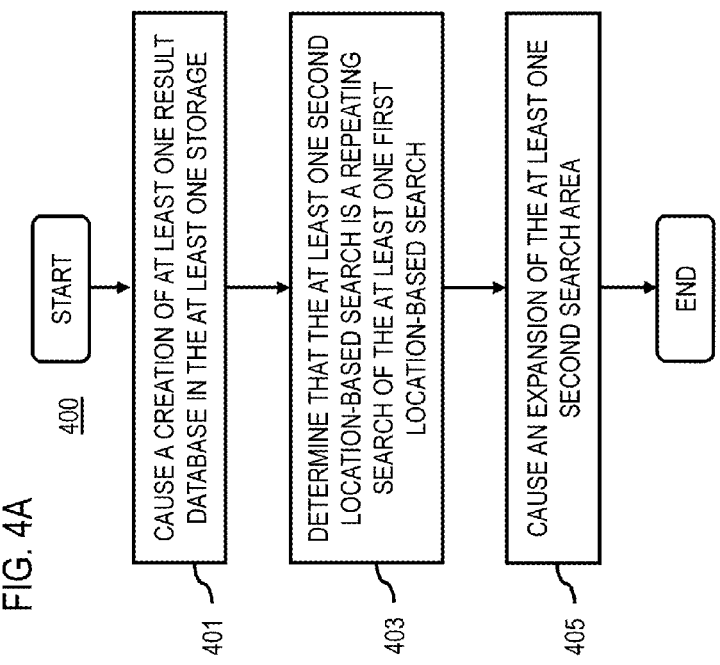
Figure 7:
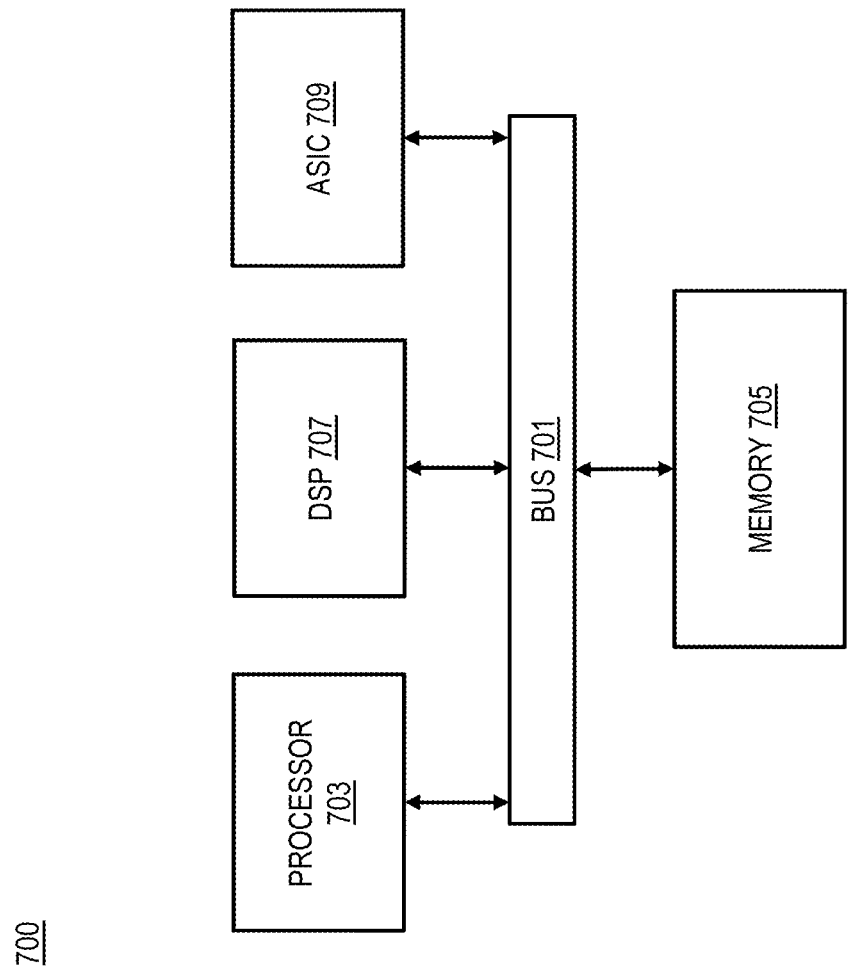
FIG. 7 is a diagram of a chip set that can be used to implement an embodiment of the invention.

FIGS. 3, 4A and 4B are flowcharts of processes for optimizing the generation of a location based search result, according to various embodiments. In one embodiment, the optimization platform 103 performs processes 300, 400 and 406 and is implemented in, for instance, a chip set including a processor and a memory as shown in FIG. 7.

In step 301 of process 300, the optimization platform 103 causes, at least in part, a generation of at least one first set of results for at least one first location-based search associated with at least one first search area. In step 303, the platform 103 receives an input for requesting at least one second location-based search associated with at least one second search area. As noted, the input may include a scrolling of a map, a panning or zooming of the map, etc. In addition, the input may include a physical change in direction or movement of the user. In another step 305, the platform causes, at least in part, an initiation of the at least one second-location based search for at least one non-overlapping area of the at least one first search area and the at least one second search area to generate at least one set of new results. As noted previously, non-overlapping area corresponds to that area associated with the second search area that has no location information in common with the first search area.

In step 307, the optimization platform 103 causes a designation of at least one portion of the at least one first set of results as at least one set of old results, wherein the at least one portion of the at least one first set of results is associated with at least one overlapping area of the at least one first search area and the least one second search area. This corresponds to a tagging and/or flagging of the data sets corresponding to the overlapping and non-overlapping areas as old and new respectively for differentiation purposes.

Per step 309, the platform 103 causes, at least in part, a return of the at least one set of new results and the at least one set of old results as at least one second set of results for the at least one second location-based search. It is noted that the at least one set of new results is transmitted between at least one search server and at least one device requesting the at least one second location-based server. Also, the at least one set of old results is retrieved from at least one storage associated with the at least one device.

In step 401 of process 400 (FIG. 4), the optimization platform 103 causes, at least in part, a creation of at least one result database in the at least one storage. As noted, the at least one result database stores, at least in part, the at least one first set of results, the at least one second set of results, the at least one set of new results, the at least one set of old results, or a combination thereof. Also, this result database may be stored locally for rapid retrieval and data access pursuant to a subsequent search request.

In step 403, the optimization platform 103 determines that the at least one second location-based search is a repeating search of the at least one first location-based search. In another step 405, the platform further causes, at least in part, an expansion of the at least one second search area, wherein the at least one second location-based search is further based on the expansion. As noted previously, the expansion may correspond to a scenario wherein the search capability or data accessibility of the navigation application, UE or user is unlimited.

In step 407 of process 406 (FIG. 4B), the optimization platform 103 determines at least one corridor area for conducting the at least one second location-based search. As noted, the expansion is based, at least in part, on the at least one corridor area. In step 409, the platform 103 determines one or more destinations, one or more waypoints, or a combination thereof associated with the one or more navigation routes, the one or more previous location-based searches, or a combination thereof. The expansion of the search may be based, at least in part, on the one or more destinations, the one or more waypoints, or a combination thereof.

Per step 411, the optimization platform 103 further causes, at least in part, a repetition of the expansion until there is at least one matching result for the at least one second location-based search. In another step 413, the platform 103 causes, at least in part, a presentation of at least one result user interface for displaying the at least one second set of results. It is noted that the at least one result user interface differentially renders the at least one set of new results and the at least one set of old results comprising the at least one second set of results.

FIGS. 5A-5E are diagrams of user interfaces utilized in the processes of FIGS. 3, 4A and 4B, according to various embodiments. By way of example, the user interfaces of a mapping application are shown as presented to the display 501 of a device. The device is configured to interact with the optimization platform 103 to optimize execution of a location based search.

Figure 5A:
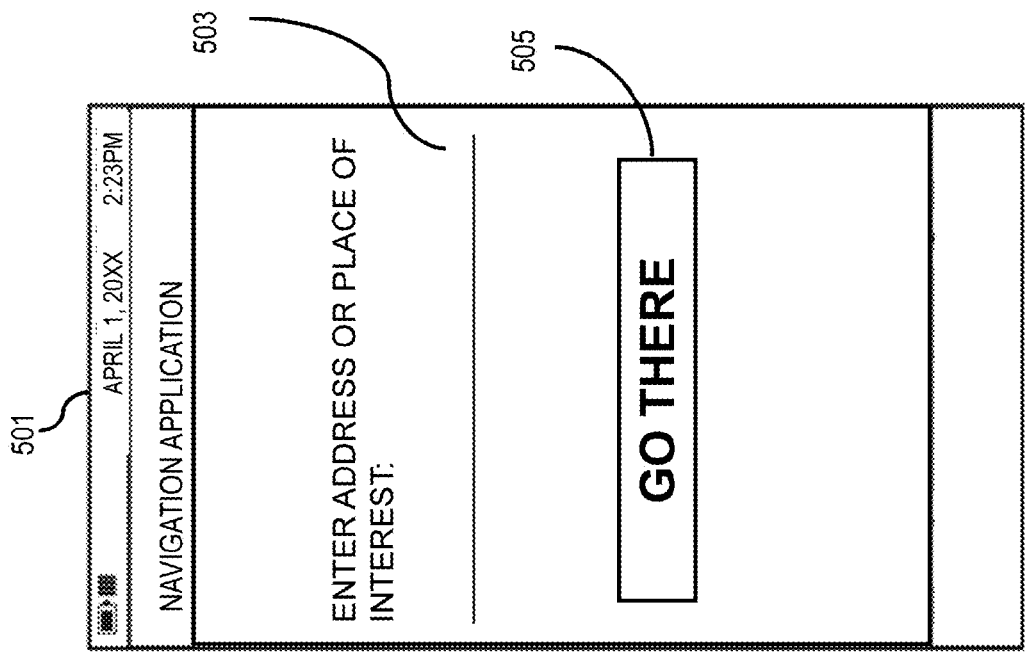
FIG. 5A-5E are diagrams of user interfaces utilized in the processes of FIGS. 3, 4A and 4B, according to various embodiments.

In FIG. 5A, the user interface 501 for the device of the user is shown. In this example, the interface 501 corresponds to a startup screen for the navigation application. The user is prompted to enter an address or place of interest they wish to search for via data entry field 503. In this case, the user has activated the sensors of the device to enable the gathering of contextual information, such as the user's current location, current time of search initiation, etc., based on the search query. For the purpose of illustration, the user enters the search term "Ice Cream" and selects the GO THERE action button 505 for initiating and acquiring search results corresponding to the criteria.

Figure 5B:
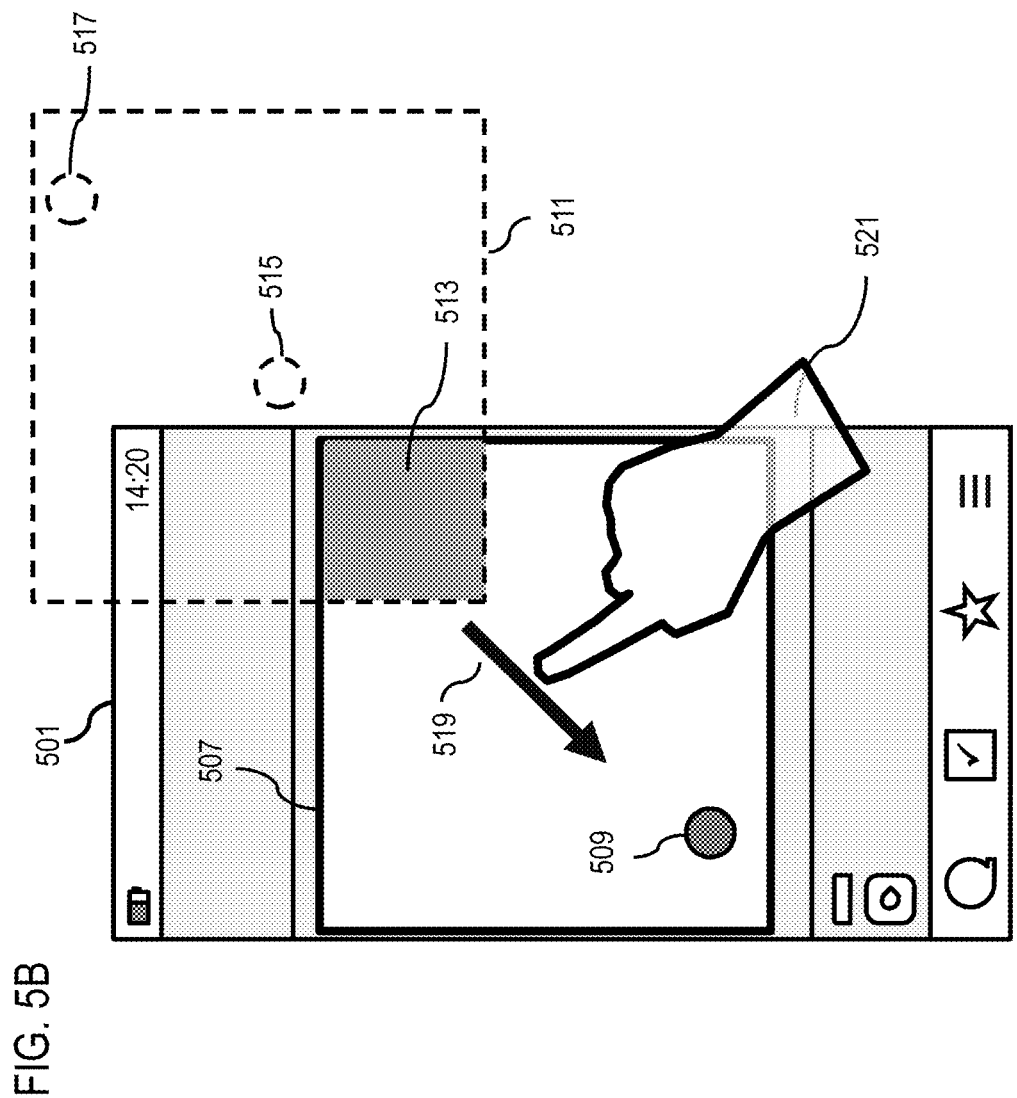
Figure 5D:
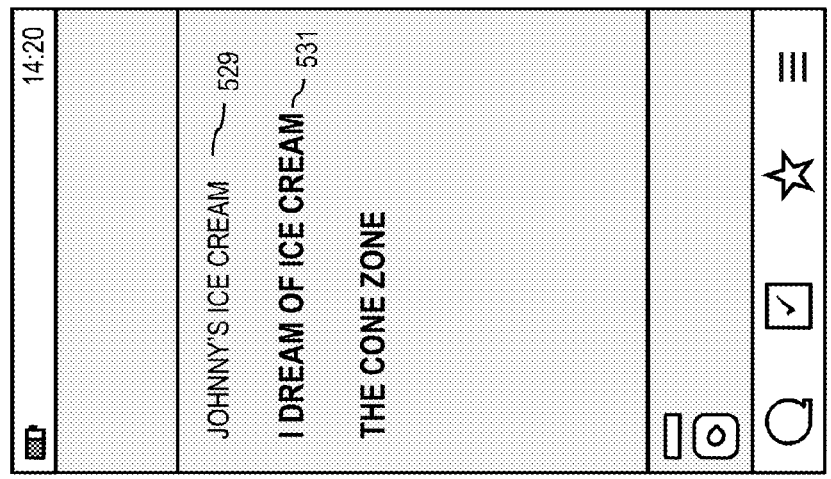

In FIG. 5B, in response to initiation of the search, the optimization platform 103 acquires information regarding ice cream vendors within a defined search range. The search range corresponds to an area 507 in which results may be identified and presented with respect to the search request. Under this scenario, an ice cream parlor corresponding to point of interest 509 is identified and presented. The current location of the user serves as a reference point for centering the map view within the search area 507. Still further, the platform 103 stores the result to a local database for subsequent retrieval and analysis.

Unsatisfied with the search result (e.g., point of interest 509), the user decides to alter the current map view to see if they can identify other search results. The user swipes their finger (per hand 521) in a downward diagonal motion 519 in order to view potential results that are not currently shown and change the orientation of the map. Motion 519 results in the generation of a subsequent search request corresponding to a second map area 511. For the purpose of illustration, the second map area 511 is shown in dotted line form to represent the inability of the user to see the map relative to the first search area 507.

In response to the new search request, the optimization platform 103 analyzes the first and second search areas 507 and 511 respectively to determine if there are any areas of overlap between them. Under this scenario, the platform 103 retrieves the first search results and compares this with the second search area 511 to determine if an overlap area exists between them. As depicted herein as shaded area 513, the platform 103 determines an area in common to both the first search area 507 and the second search area 511. Per this determination, the platform 103 then designates the overlap area as an optimized search result set. In addition, the platform 103 identifies and designates the portion of the map presented within the second area 511 but less the shaded area 513 as the new area.

Based on the designations, the optimization platform 103 initiates the second search request based on only the new area rather than on the entirety of the second search area 511. As such, only the geocoordinates corresponding to the new area are submitted to the service for execution of the search, while the overlap area 513 is retrieved directly from the local database. It is noted that by conducting the search on the basis of the new area, the amount of data required to be transmitted and/or acquired to render the second search results is lessened.

Figure 5C:
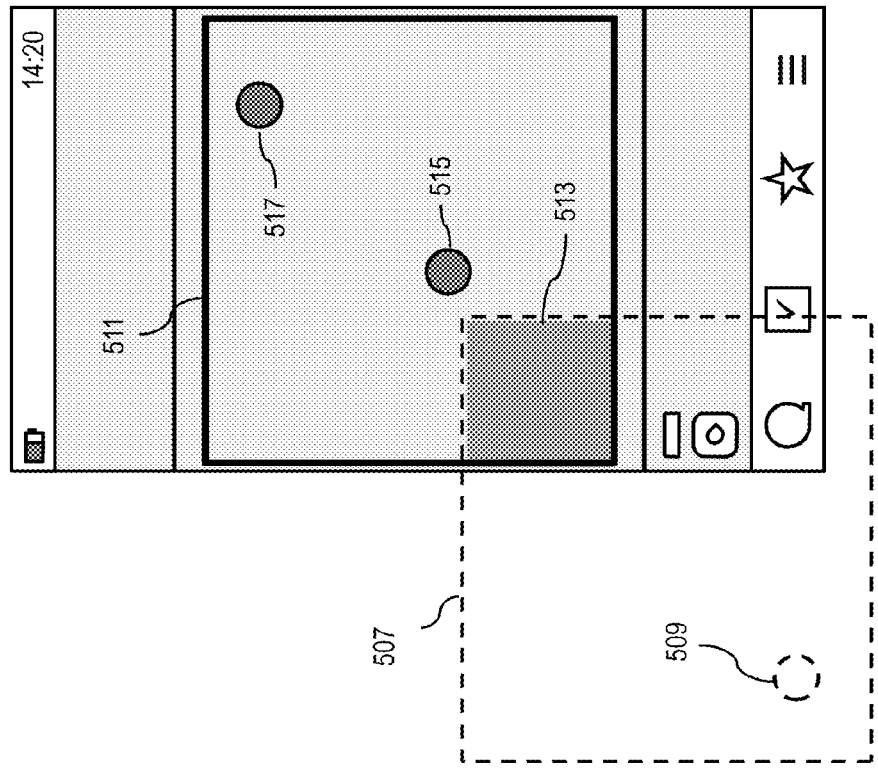

In FIG. 5C, the second search results are shown as a map view corresponding to the second search area 511. For the purpose of illustration, the first search area 507 is depicted as a dotted line positioned in an offset manner to represent the altering of the map view based on the user provided input (e.g., motion 519). Under this scenario, the user is now able to view the points of interest 515 and 517 corresponding to the search criteria for this particular area 511. Unlike the first map area 507, two different locations for the user are presented, including one (e.g., 515) that is within close proximity to the center point of the map (e.g., a pending location of the user). Of note, the total amount of data transmitted and/or acquired to generate the search result as shown per area 511 is reduced as a result of not duplicating the search acquisition effort. Also In FIG. 5D, the search results are presented in list mode instead of map view. Under this scenario, the first new search result as determined per motion 519 is highlighted in the list. The platform 103 highlights the search result to enable the user to easily distinguish between the new results and the old results of the search. While not shown expressly herein, the map view may also be highlighted in some fashion to enable users to distinguish between old and new points of interest or other data as presented when the user scrolls between the first and second map search areas 507 and 511.

Figure 5E:
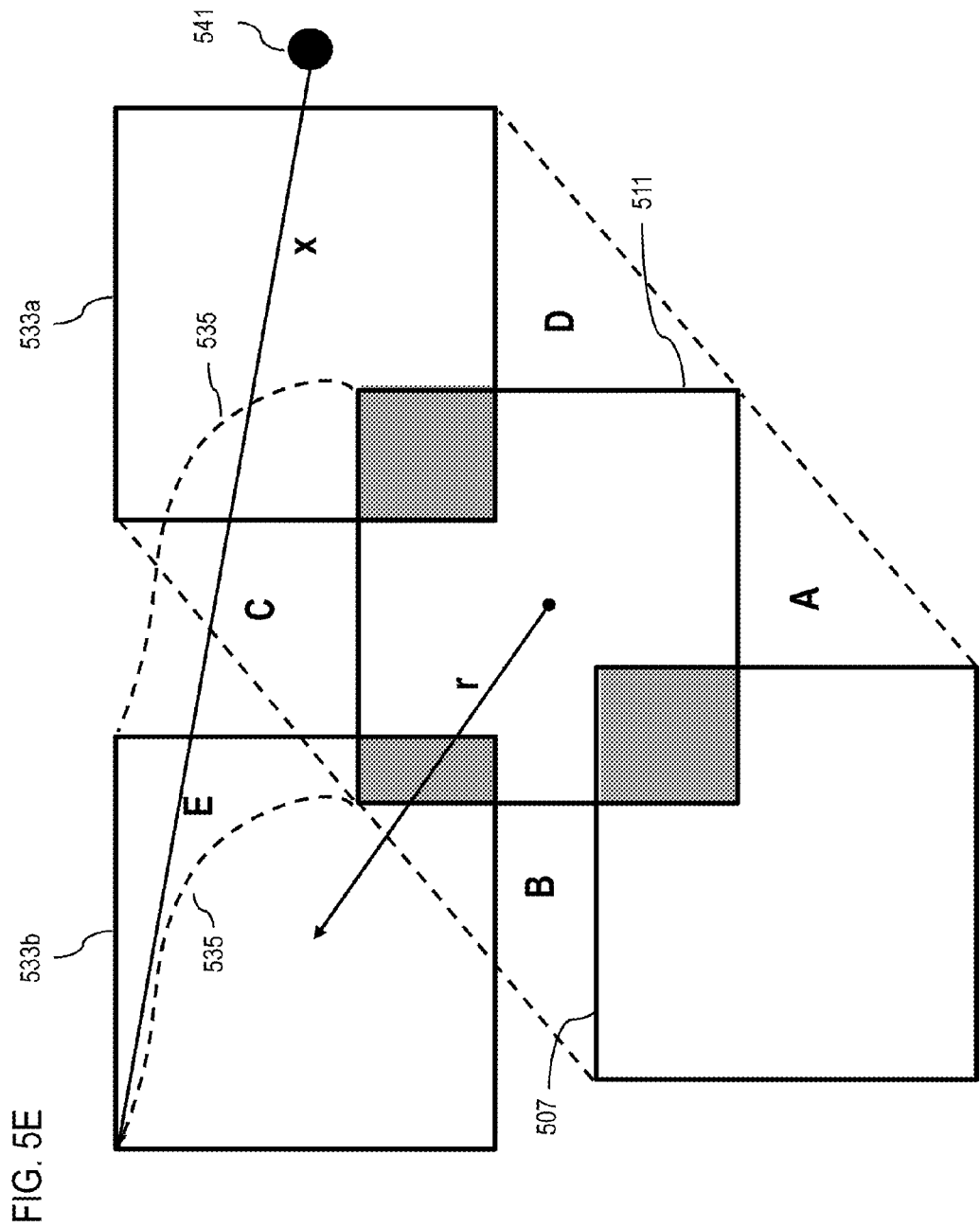

Per FIG. 5E, in the case where the user was not satisfied with the second set of results per the second search area 511, the optimization platform 103 enables the search procedure to be expanded automatically. For example, when the user swipes beyond the second map area 511 corresponding to a third map area 533, the platform 103 automatically initiates a third search request. The resulting map view rendered as a result of this request is based on the previous search results corresponding to search area 511, as stored, wherein only the non-overlapping area between areas 533a and 511 are requested. Thus, the optimization platform 103 keeps the search active (since acquisition of the first search result corresponding to search area 507) until the user exits the application or selects at least one search result they are satisfied with.

Still further, the platform 103 enables a corridor search to be performed, wherein the search area is expanded to include/define/encompass area that was not originally defined per the search. Under this scenario, the areas labeled A, B, C and D are formed per the corridor pathway between respective search areas 507, 511 and 533a. It is noted that while areas A-D are the result of a straight line motion (e.g., finger swipe) of the user, other movement patterns may also be executed for initiating a search. For example, the user may execute a curved motion (e.g., as reflected by curved lines 535) resulting in the generation of a map area 533b. This corresponds to an area E formed per a corridor pathway between search area 511 and 533b. Thus, the optimization platform 103 may therefore account for a variety of movement patterns, including random patterns, for enabling automated search expansion. Also, the search corridor does not have to match the navigation route originally set by the user in order to enable the expansion of a search.

It is noted that the speed, direction and number of swipes executed by the user via the touch screen interface may define how far new searches are expanded. For example, if the user swipes fast multiple times, multiple additional searches are performed automatically versus the user having to swipe slowly or only once from original map view. Also, the actual change in motion and/or location of the user may be utilized as input for expanding the search. For example, if the user is starts moving from their current location while a current area map is presented, the motion is processed as input for initiating another location-based search. As such, the movement of the user relative to their position/location against the map is identical to a direct input at the device.

Still further, a new search corridor or search area may be defined based on any waypoints or location points set during the course of a navigation search. For example, in the case of the newly created map area 533b, the distance r from the original search/map area 511 is used to define the new distance (or search radius). Similarly, in the case where a location point 541 was set as part of the original navigation route, the motion of the user or repositioning of the map towards or away from the location point may decrease or increase the search radius. By way of example, when the user swipes the map to generate map area 533b, the distance x from the location point 541 to the perimeter of the map area 533b redefines the overall shape or extent of the new search area. This corresponds to dynamic resizing and reshaping of the search area (or search radius). In certain instances, the platform 103 may generate a notification message or alert in instances where the extent of the search area is approaching or reaches a predefined limit. This execution ensures the search doesn't expand too far away from the location point. While not shown, the search may also be expanded to encompass scenarios wherein the search areas do not overlap, i.e., due to their large distance from one another. In this case, this type of search may be performed by the platform 103 even when the user is not in a navigation mode of travel. This is due to the fact that the corridor search is based on the pattern created from the previous searches. In addition, the corridor may be defined based on any waypoints of location points that have been set during the course of a navigation search.

It is noted that the above described contiguous search processing approaches reduce the amount of user interaction required to conduct and expand a search.

The processes described herein for optimizing the generation of a location based search result may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
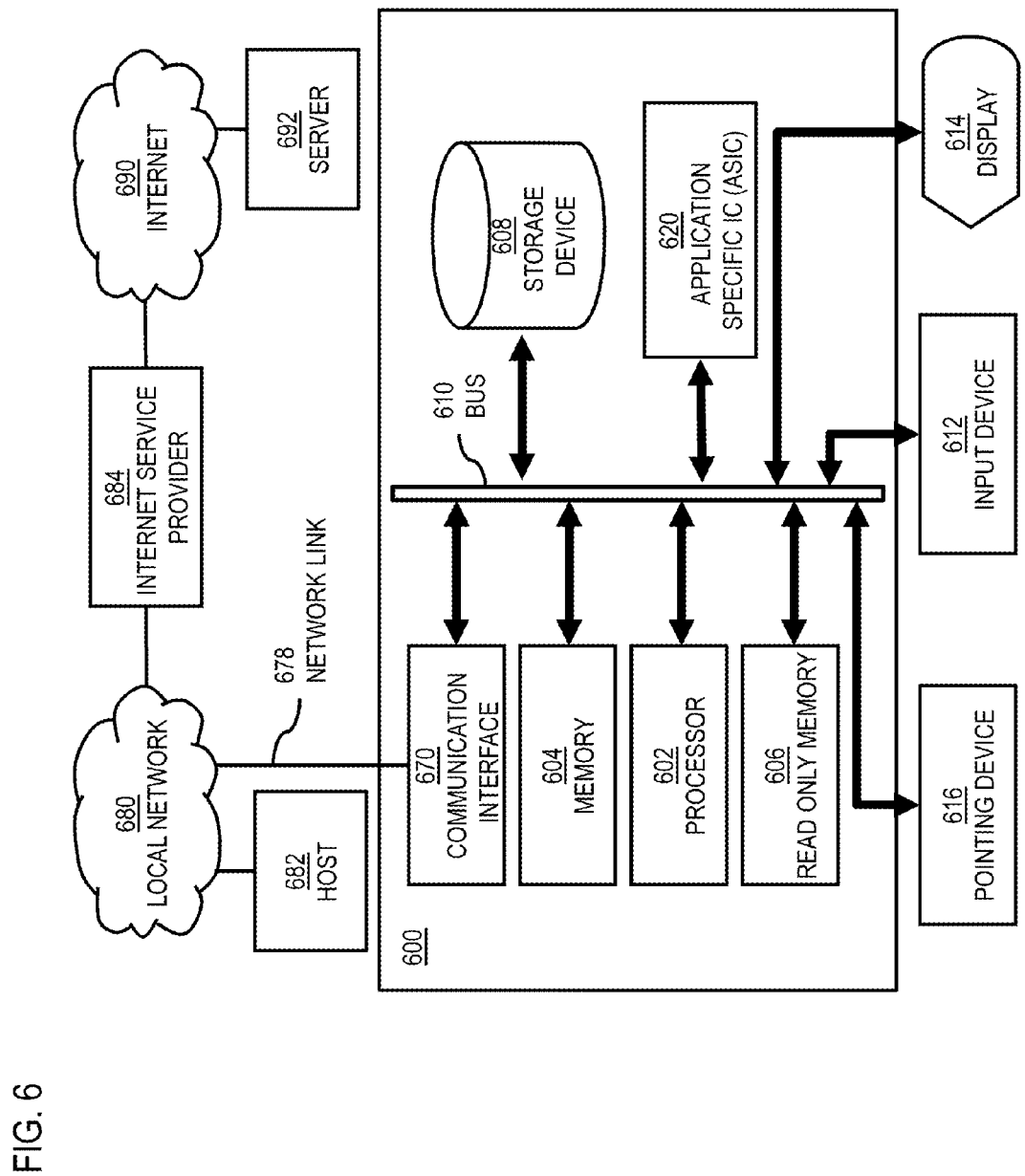
FIG. 6 is a diagram of hardware that can be used to implement an embodiment of the invention.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5E, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 either use electrical, electromagnetic or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to optimize the generation of a location based search result as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of optimizing the generation of a location based search result.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to optimize the generation of a location based search result. The memory 705 also stores the data associated with or generated by the execution of the inventive steps.

Figure 8:
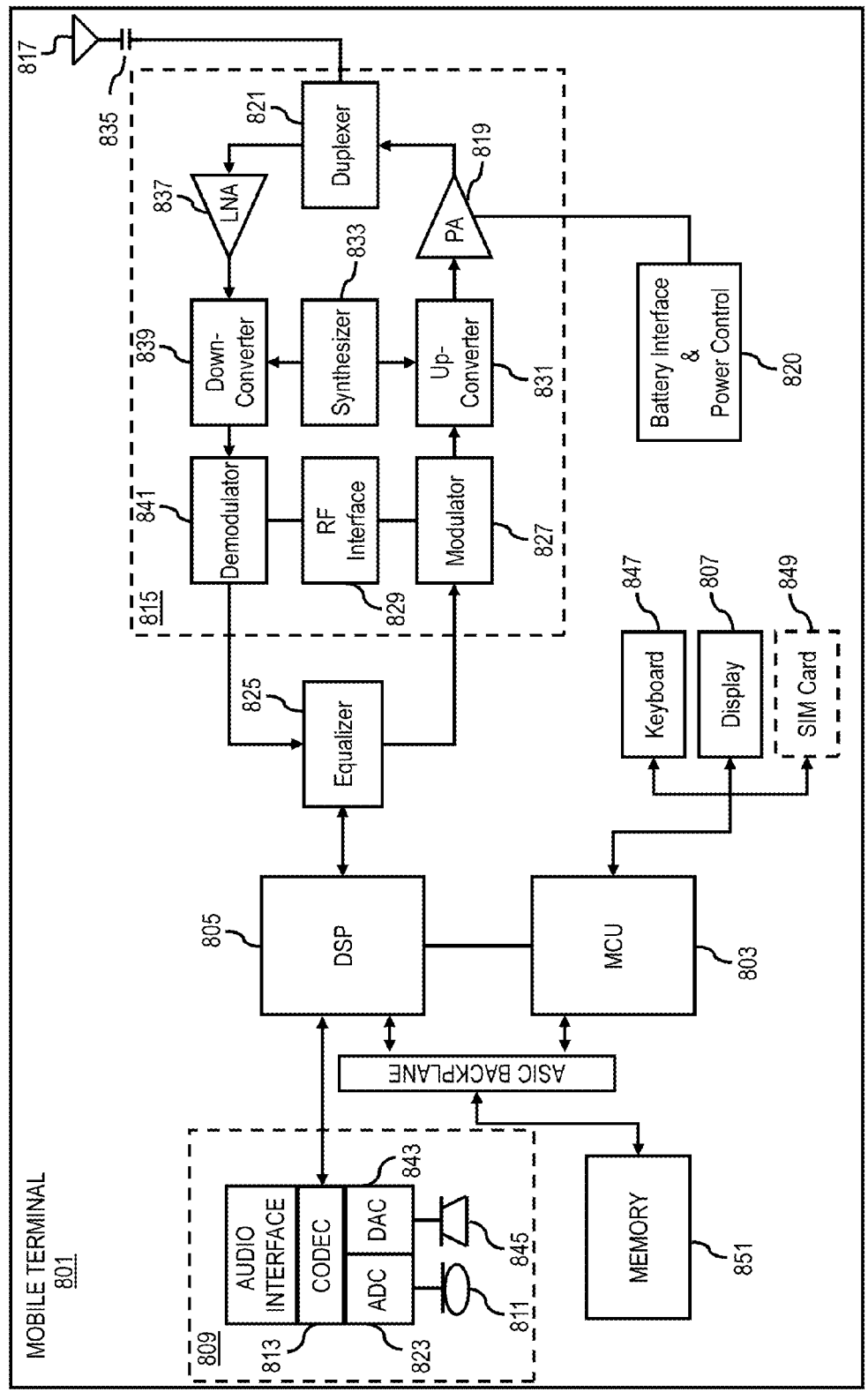
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of optimizing the generation of a location based search result. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of optimizing the generation of a location based search result. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to optimize the generation of a location based search result. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

While certain exemplary embodiments and implementations have been described herein, other embodiments and modifications will be apparent from this description. Accordingly, the invention is not limited to such embodi-

What is claimed is:

1. A method for reducing data transmissions from a search server to a device by modifying a location-based search request from the device, comprising:
   receiving, by the search server, the location-based search request from the device, wherein the location-based search request specifies a first geographic search area;
   determining, utilizing at least one processor, a prior location-based search request associated with the device, wherein the prior location-based search request specifies a second geographic search area characterized by having an overlapping area in common with the first geographic search area;
   determining a modified first geographic search area by identifying a non-overlapping area from the first geographic search area characterized as having no area in common with the second geographic search area; and
   transmitting, by the search server, search results to the device in response to the location-based search request, wherein the search results are generated based on at least some part of the identified non-overlapping area and excluding at least some part of the overlapping area in common with the first geographic search area.

2. The method of claim 1, wherein the prior-location based search request is determined from a prior search results database.

3. The method of claim 1, wherein the search results transmitted by the search server are combined with at least some part of prior search results for the prior location-based search request that are stored locally in at least one local storage of the device; and wherein the combined search results are presented at the device in response to the location-based search request.

4. The method of claim 3, wherein a user interface of the device differentially renders the search results and the prior search results when presenting the combined search results.

5. The method of claim 1, further comprising:
   determining a data limit associated with the device; and
   modifying the first geographic search area for the location-based search based on the data limit.

6. The method of claim 5, wherein the data limit specifies whether the device has limited data or unlimited data.

7. The method of claim 5, wherein the first geographic area is expanded recursively until the search results indicate a matching result for location-based search request.

8. The method of claim 5, wherein the expanding of the first geographic area is further based on a potential route of the device.

9. The method of claim 5, wherein the expanding of the first geographic area is further based on a direction of travel of the device.

10. The method of claim 5, wherein the expanding of the first geographic area is further based on a direction, a number, a speed, a user interaction with a user interface of the device or a combination thereof.

11. An apparatus for reducing data transmissions from a search server to a device by modifying a location-based search request from the device, comprising:
    at least one processor; and
    at least one memory including computer program code associated with one or more programs,
    the at least one memory and the computer program code configured to, with the at least one processor, cause the apparatus to perform at least the following,
    receive, by the search server, the location-based search request associated with the device, wherein the location-based search request specifies a first geographic search area;
    determine a prior location-based search request from the device, wherein the prior location-based search request specifies a second geographic search area characterized by having an overlapping area in common with the first geographic search area;
    determine a modified first geographic search area by identifying a non-overlapping area from the first geographic search area characterized as having no area in common with the second geographic search area; and
    transmit, by the search server, search results to the device in response to the location-based search request, wherein the search results are generated based on at least some part of the identified non-overlapping area and excluding at least some part of the overlapping area in common with the first geographic search area.

12. The apparatus of claim 11, wherein the search results transmitted by the search server are combined with at least some part of prior search results for the prior location-based search request that are stored locally at the device; and wherein the combined search results are presented at the device in response to the location-based search request.

13. The apparatus of claim 11, wherein the apparatus is further caused to:
    determine a data limit associated with the device; and
    modify the first geographic search area for the location-based search based on the data limit.

14. The apparatus of claim 13, wherein the first geographic area is expanded recursively until the search results indicate a matching result for location-based search request.

15. The apparatus of claim 13, wherein the expanding of the first geographic area is further based on a potential route of the device.

16. The apparatus of claim 13, wherein the expanding of the first geographic area is further based on a direction of travel of the device.

17. The apparatus of claim 13, wherein the expanding of the first geographic area is further based on a direction, a number, a speed, a user interaction with a user interface of the device or a combination thereof.

18. A non-transitory computer-readable storage medium for reducing data transmissions from a search server to a device by modifying a location-based search request from the device, carrying one or more sequences of one or more instructions which, when executed by one or more processors, cause an apparatus to at least perform the following steps:
    receiving, by the search server, the location-based search request from the device, wherein the location-based search request specifies a first geographic search area;
    determining, utilizing at least one processor, a prior location-based search request associated with the device, wherein the prior location-based search request specifies a second geographic search area characterized by having an overlapping area in common with the first geographic search area;
    determining a modified first geographic search area by identifying a non-overlapping area from the first geographic search area characterized as having no area in common with the second geographic search area; and
    transmitting, by the search server, search results to the device in response to the location-based search request, wherein the search results are generated based on at least some part of the identified non-overlapping area and excluding at least some part of the overlapping area in common with the first geographic search area.

19. The non-transitory computer-readable storage medium of claim 18, wherein the search results transmitted by the search server are combined with at least some part of prior search results for the prior location-based search request that are stored locally in at least one local storage of the device; and wherein the combined search results are presented at the device in response to the location-based search request.

20. The non-transitory computer-readable storage medium of claim 18, wherein the apparatus is further caused to perform:

determining a data limit associated with the device; and
  modifying the first geographic search area for the location-based search based on the data limit.

* * * * *